(12) United States Patent
Vuillermoz

(10) Patent No.: US 7,854,128 B2
(45) Date of Patent: Dec. 21, 2010

(54) VACUUM PUMP DAMPING ADAPTER

(75) Inventor: Jean-François Vuillermoz, Annecy le Vieux (FR)

(73) Assignee: Alcatel, Paris (FR)

( * ) Notice: Subject to any disclaimer, the term of this patent is extended or adjusted under 35 U.S.C. 154(b) by 267 days.

(21) Appl. No.: 11/083,989

(22) Filed: Mar. 21, 2005

(65) Prior Publication Data

US 2005/0204754 A1   Sep. 22, 2005

(30) Foreign Application Priority Data

Mar. 22, 2004   (FR)   .................................. 04 50565

(51) Int. Cl.
*B01D 8/00*   (2006.01)
(52) U.S. Cl. ......................................... 62/55.5; 62/295
(58) Field of Classification Search ................ 62/55.5, 62/295, 100, 268; 417/363, 901; 248/560, 248/614, 516, 562, 636, 638, 559; 285/226, 285/227, 228, 229; 92/42, 44
See application file for complete search history.

(56) References Cited

U.S. PATENT DOCUMENTS

| | | | | |
|---|---|---|---|---|
| 4,523,612 A | * | 6/1985 | Kuklo | ......................... 138/30 |
| 4,626,730 A | * | 12/1986 | Hubbard, Jr. | ................. 310/326 |
| 4,862,697 A | * | 9/1989 | Tugal et al. | ................... 62/55.5 |
| 5,067,684 A | * | 11/1991 | Garnjost | ..................... 248/550 |
| 5,294,757 A | * | 3/1994 | Skalski et al. | ............... 187/393 |
| 5,713,438 A | * | 2/1998 | Rossetti et al. | .............. 188/378 |
| 5,775,737 A | | 7/1998 | Morgner et al. | |
| 5,924,282 A | * | 7/1999 | Thomas | ........................ 60/323 |
| 6,065,742 A | * | 5/2000 | Whiteford | ................ 267/140.5 |
| 6,065,780 A | | 5/2000 | Hiroshima | |
| 6,667,844 B1 | * | 12/2003 | Yao et al. | ........................ 360/75 |
| 2003/0051958 A1 | * | 3/2003 | Esche et al. | ................. 188/379 |

FOREIGN PATENT DOCUMENTS

| | | |
|---|---|---|
| DE | 3436982 A1 | 4/1986 |
| DE | 100 01 509 A1 | 7/2001 |
| JP | 4-125383 | 4/1992 |
| WO | WO 02/086325 A1 | 10/2002 |

* cited by examiner

*Primary Examiner*—Mohammad M Ali
(74) *Attorney, Agent, or Firm*—Sughrue Mion, PLLC

(57) ABSTRACT

The invention concerns a damping adapter (3) insertable in a suction duct between a service chamber (2) and a vacuum pump (1). The adapter (3) consists of a tubular duct wall (6) in the form of a flexible bellows surrounded by a damping sleeve (7) supported on two end flanges (4, 5). The flexible bellows' plys (6a, 6b) receive a passive damping elastomer (8a) on their outer faces, engaged between the successive plys (6a, 6b). This considerably reduces the transmitting of vibrations from the vacuum pump (1) to the service chamber (2), enabling applications in the microscopy field in particular.

11 Claims, 9 Drawing Sheets

VACUUM PUMP DAMPING ADAPTER

The invention concerns vacuum generating lines intended for use in fields in which the vibrations generated and transmitted from the vacuum pump may have a negative effect on use.

Of the many applications of vacuum pumps, two applications in particular are sensitive to the vibrations emitted by pumps: Microelectronic microscopy and lithography.

The invention more particularly concerns vacuum pump applications in the field of electron microscopy dimensional analysis, which may reach resolutions equal to a pressure gauge. The smallest vibration is therefore detrimental to observation. However, in broader terms, all applications implementing vacuum pumps and with equivalent vibratory constraints are concerned by the invention.

For reasons of cost and efficiency, in particular to reduce the number of ducts connecting the vacuum pumps to the service chambers, equipment manufacturers try to directly incorporate the vacuum pumps in the service chambers or in their immediate proximity.

To eliminate, or at least greatly reduce, the vibrations generated by the pumps, flexible damping ducts are already inserted between the vacuum pump and the service chamber. This is particularly necessary for turbomolecular pumps fitted with ball bearings, whose rotation speed is very high (upwards of thirty thousand revolutions a minute) and that generate a significant vibratory level.

Such a known flexible damping duct, insertable between two connection flanges, takes the form of a bellows, i.e. a flexible wavy pipe with high parallel plys for high flexibility. Damping is provided by a cylindrical elastomer sleeve, split along its axis, that is supported on the bellows' end flanges and envelopes their outer part. This limits the crushing of the bellows when the vacuum is created inside and guarantees the flexibility of the connection element and the damping of the transmission of vibrations from one flange to the next.

In a traditional assembly, the vacuum pump is assembled floating, suspended from its enclosure by the suction duct. The dampened flexible cylindrical bellows resists the vacuum and therefore supports the pump's weight.

However, in current systems, sufficient damping of the vibrations requires the use of two bellows, one after the other, separated by an appropriate inertial mass, creating a two-stage filter. The production and assembly costs are therefore higher and the overall axial dimensions are considerably increased.

To reduce the vibrations emitted by the vacuum pump itself, an existing magnetic bearing turbomolecular pump may be used as a vacuum pump. The use of magnetic bearings, which are not in contact and do not create friction between the rotating mass and the static part, eliminates the majority of the vibrations emitted by the pump. However, in general it seems that a vibration peak may still be generated at a frequency close to that of the pump's rotation. Although this vibration peak is lower than with ball bearing vacuum pumps, it is still necessary to use a double dampened bellows.

Existing bellows are also not completely safe for use with turbomolecular pumps whose rotation speeds are very high and that therefore contain a large amount of kinetic energy that must be dissipated if the pump stops suddenly and accidentally.

The invention is intended to avoid the disadvantages of previous systems, in particular by very noticeably reducing the vibrations transmitted to the service chamber and originating from a turbomolecular pump, whether this pump is assembled suspended from its enclosure or is assembled "floating", while preventing the need for a plurality of bellows placed one after the other.

Thus, the objective is to limit vibrations by means of a single damping bellows with a particular structure, which is simultaneously able to withstand the rotation stresses incurred on the sudden and accidental deceleration of the turbomolecular pump requiring the dissipating of a large amount of energy.

The main idea behind the invention is to create a single-stage bellows that effectively dampens vibrations, thanks to an axial damping elastomer sleeve similar to the usual configuration, but also combined with damping elements engaged between the bellows' successive plys according to its outer face. The hardness of the damping elements is appropriate to the damping sought.

The invention therefore proposes a vacuum line damping adapter insertable in a suction duct between a service chamber and a vacuum pump, the adapter consisting of a tubular duct wall in the form of a bellows flexible at both ends and surrounded by a damping sleeve supported on both ends of the flexible bellows; the flexible bellows' plys receive a passive damping elastomer, engaged between said plys, on their outer faces.

With an equal inner diameter, the single bellow's inner space is therefore not as long as a traditional structure with two or several bellows, which improves the pumping speed while reducing the vibrations transmitted to a degree equivalent to that of a traditional assembly with two standard elements.

According to one advantageous approach, the passive damping elastomer engaged between the bellows' plys is joined to the damping sleeve.

In practice, the passive damping elastomer may advantageously be of a piece with the damping sleeve.

A structure producing satisfactory results consists of the damping elastomer, between two successive plys of the flexible bellows, having the form of a circular crown when at rest, whose inner diameter is radially apart from the flexible bellows.

The possible use of a pump casing directly incorporating the mounting of a specific bellows flange described allows the further optimization of the pump's flow rate performance while minimizing the overall length of the suction duct.

According to another advantageous approach, anti-rotation clevis' may also be used around the bellows, that are fitted with elastomer bearing pads and surround the enclosure flange when the pump is in normal use without coming into contact with the securing dogs. These diametrally opposed clevis', which are joined to the pump's securing flange, are blocked in their rotation by the enclosure flange's securing dogs and allow the withstanding of any rotation stresses on the sudden and accidental deceleration of the turbomolecular pump. This avoids the need for a mechanical mounting dampened in relation to the equipment's frame.

In normal operation, there is a low amount of pressure inside the bellows and the plys are therefore compressed. However, in the presence of atmospheric pressure inside the bellows, it returns to its initial relaxed position. The suspending of a mass such as that of a pump from this duct element may cause the expanding of the plys beyond this position of equilibrium. To limit this expansion, a traction stop device may be secured to the flanges inside the duct. This device opposes the axial extending of the bellows beyond a determined value. In the presence of a low internal pressure, the stops' contact is disconnected and prevents the transmitting of vibrations.

The new bellows structure also allows the use of a small diameter, low mass turbomolecular pump, which may be inserted in whole or in part inside a bellows of an equivalent size. This further reduces the duct's length, which is favorable for improving the pump's pumping speed. The overall axial dimensions and the overall volume of the device are therefore reduced.

In the case of a cantilevered assembly, a specific retaining element secured to the enclosure flange elastically retains the suspended mass.

Other objectives, properties and advantages of the present invention will be explained in the following description of specific approaches, made in reference to the figures attached, of which:

Figure 1:
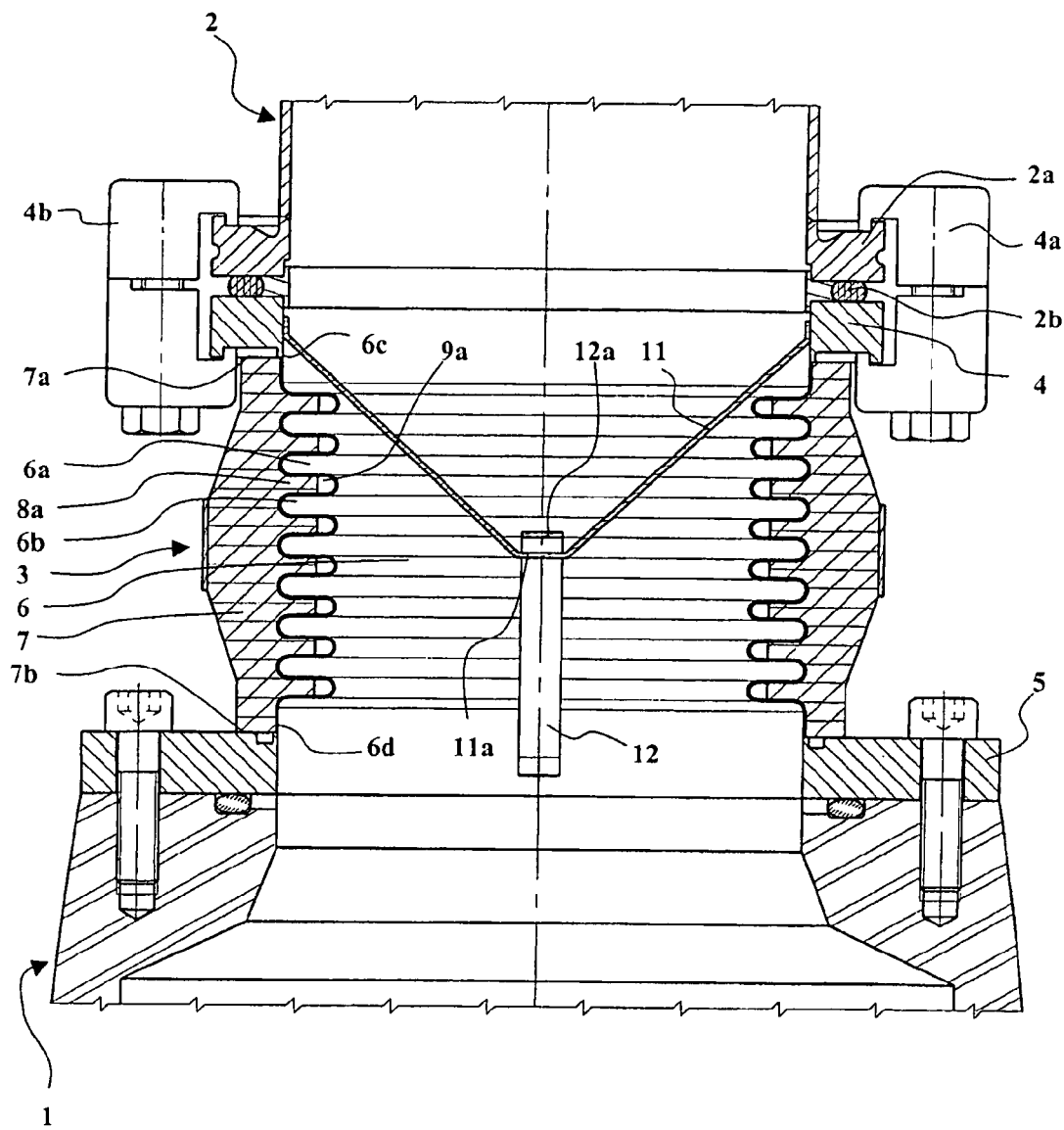
FIG. 1 is a cross-sectional front view showing a passive damping adapter structure according to a first approach, combined with a turbomolecular pump suspended axially at the end of the damping adapter.

In the approach illustrated in FIG. 1, a vacuum pump 1 is suspended from a service chamber 2 by means of the damping adapter 3.

The damping adapter 3 basically consists of an inlet annular flange 4 and an outlet annular flange 5 that are coaxial and connected to each other by a thin multi-ply coaxial tubular wall 6 intended to conduct the pumped gases from the service chamber 2 to vacuum pump 1.

The inlet annular flange 4 is combined with diametrally opposed tightening dogs such as dogs 4a and 4b for its axial union with a flange 2a for connection with service chamber 2. The flanges 4 and 2a are thus tightened against each other with the interposition of a gasket 2b.

The coaxial tubular wall 6 is in the form of a multi-ply flexible metal bellows with radial excrescences forming successive plys such as the plys 6a and 6b. The ends 6c and 6d of the tubular wall 6 are joined to inlet flange 4 and outlet flange 5 respectively, for example through welding.

The tubular wall 6, in the form of a flexible bellows, is surrounded by a coaxial damping sleeve 7 whose ends 7a and 7b are supported against the inlet flange 4 and the outlet flange 5 respectively. The damping sleeve 7 is made from elastomer. Good results are obtained by choosing a hardness of around 70 Shore.

The flexible bellows' plys forming the tubular wall 6 receive, on their outer faces, a passive damping elastomer such as the elastomer 8a engaged between adjacent plys such as the plys 6a and 6b.

In the approach illustrated on FIG. 1, the passive damping elastomer 8a is of a piece with the damping sleeve 7.

As an alternative, a passive damping elastomer 8a in the form of a circular crown, that may or may not be joined to damping sleeve 7, may be engaged between the successive plys 6a and 6b. A passive damping elastomer 8a may therefore be chosen that is different from the elastomer making up the damping sleeve 7, to optimize the overall damping properties of the damping adapter 3.

As can be seen in the figure, such a passive damping elastomer 8a is engaged in each of the intervals separating two successive plys of the tubular wall 6.

Again in the approach illustrated in FIG. 1, between the two successive plys 6a and 6b of the flexible bellows forming the tubular wall 6, the damping elastomer 8a has the form of a circular crown when at rest, whose inner diameter is radially apart from the flexible bellows, leaving an annular space 9a.

Figure 2:
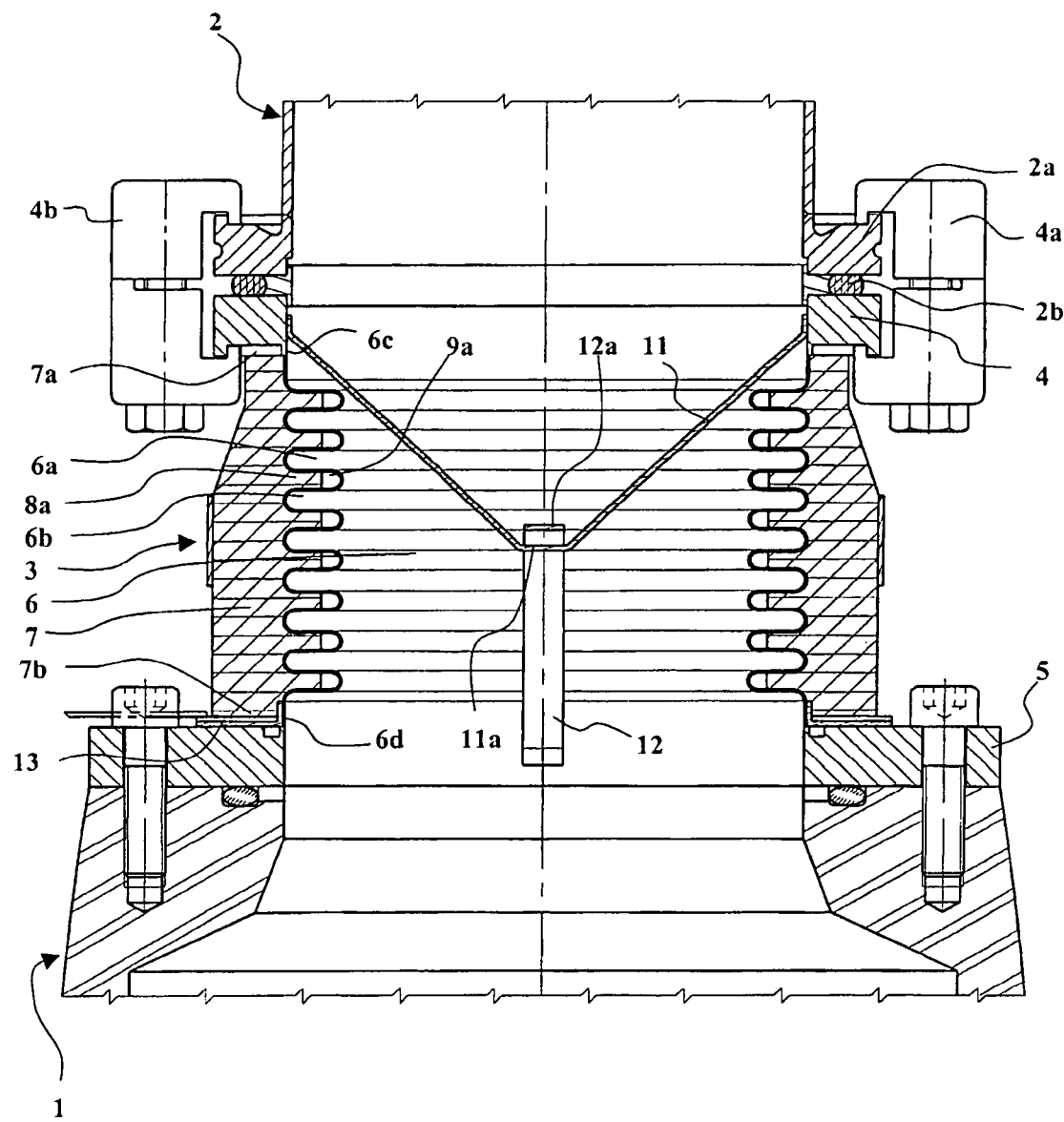
FIG. 2 is a cross-sectional front view showing an active film damping adapter according to a second approach, combined with a turbomolecular pump suspended axially at the end of the damping adapter.

In the approach in FIG. 2, the damping sleeve 7, according to the invention, also includes of an active vibration control device, which optimizes the damping of vibrations. In this figure we can see the same elements as in the approach in FIG. 1 and these same elements have the same numeric references. In this case, the active vibration control device consists of a piezoelectric transverse film 13, engaged between an end 7b of the damping sleeve 7 and the outlet flange 5 that ensures the connecting of the vacuum pump 1. The piezoelectric film 13 may be powered by a control device operating according to signals originating either from a vibration sensor arranged in an appropriate way, a vacuum pump 1 magnetic bearing control device, or a device powering the drive motor of the vacuum pump 1.

Figure 3:
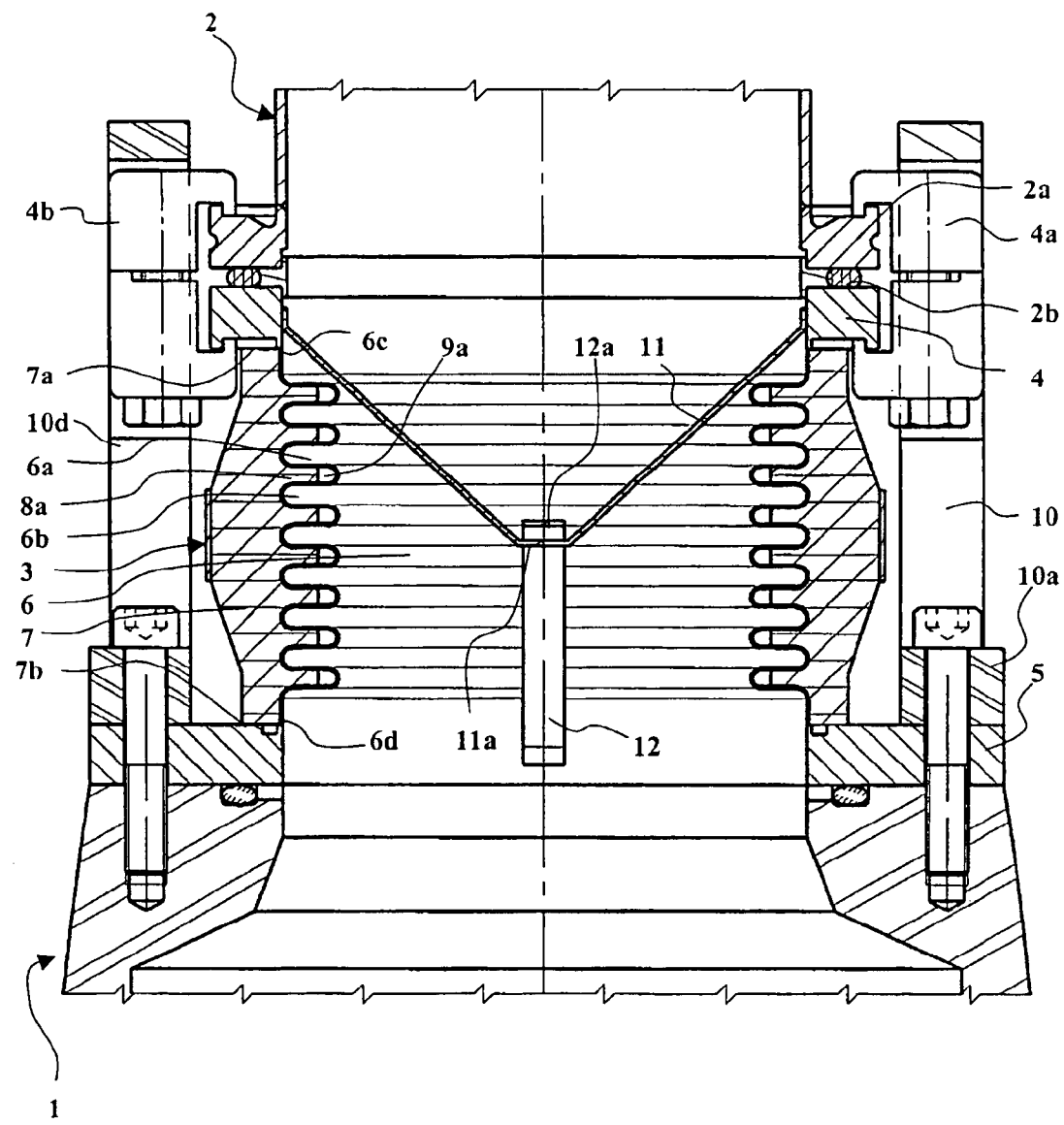
FIG. 3 is a cross-sectional front view of a passive damping adapter similar to that of FIG. 1 but including rotation stop devices.
Figure 4:
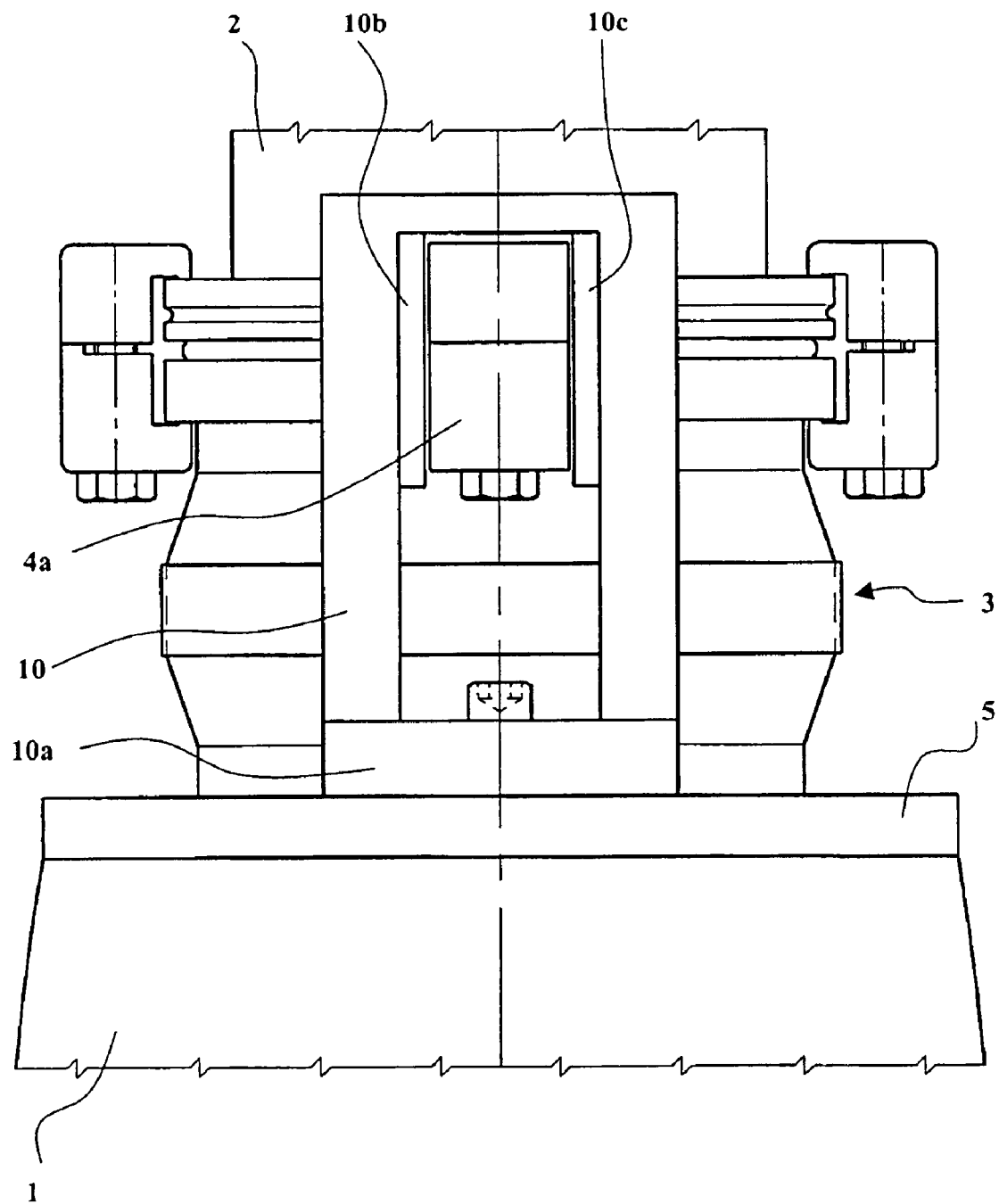
FIG. 4 is a side view of the damping adapter in FIG. 3.

In the approach illustrated in FIGS. 3 and 4, the same elements can be found as in the approach in FIG. 1, and these same elements have the same numeric references. Anti-rotation devices may also be used on the outside of the tubular wall 6, intended to oppose the relative rotation of the inlet flange 4 and the outlet flange 5 beyond a determined rotation threshold.

For example, the anti-rotation devices may include at least one anti-rotation clevis 10, joined to the outlet flange 5 by a first end 10a, and able to engage with a tightening dog 4a of the inlet flange 4 in the case of a relative rotation between the inlet flange 4 and the outlet flange 5. However, in normal operation, the clevis 10 does not come into contact with the tightening dog 4a of inlet flange 4, to prevent the transmission of vibrations. Two elastomer side bearing pads 10b and 10c, which are more clearly visible in FIG. 4, may also be used in the anti-rotation clevis 10, forming the surfaces on which the anti-rotation clevis 10 is supported against the tightening dog 4a in the case of the relative rotation of the inlet flange 4 and the outlet flange 5.

The anti-rotation devices preferably include at least two diametrally opposed anti-rotation clevis' 10 and 10d, to balance out the rotation blocking stresses.

The outlet flange 5 and the inlet flange 4 are also fitted with gap limiting stop devices.

Thus, in the approaches illustrated in FIGS. 1 to 4, the inlet flange 4 includes a diametral inlet arch 11 that develops in the flexible bellows' inner space forming the tubular wall 6. Similarly, the outlet flange 5 includes a diametral outlet arch 12 in a perpendicular plane to that of the inlet arch 11 that develops in the inner space of the tubular wall 6. The two arches 11 and 12 are imbricated, such that the inlet arch 11 crosses the outlet arch 12 and vice versa. In addition, in their position under normal use, in other words in the presence of a vacuum inside the damping adapter owing to the effect of the compression exercised by the external atmospheric pressure, the flanges 4 and 5 are brought relatively close together, and in this state the apexes 11a and 12a of the two arches 11 and 12 are apart from each other, as illustrated in FIG. 1. This means that, in the absence of an inner vacuum, the flanges 4 and 5 tend to come apart under the effect of the weight of the vacuum pump 1, but the apexes 11a and 12a of the arches 11 and 12 are then supported one against the other and prevent the flanges 4 and 5 from coming apart beyond a determined value. The arches 11 and 12 therefore constitute the gap limiting stop devices.

In the approaches in FIGS. 1 to 4, the invention includes a vacuum line with a damping adapter 3 inserted in a vacuum duct between the vacuum pump 1 and a service chamber 2.

Figure 5:
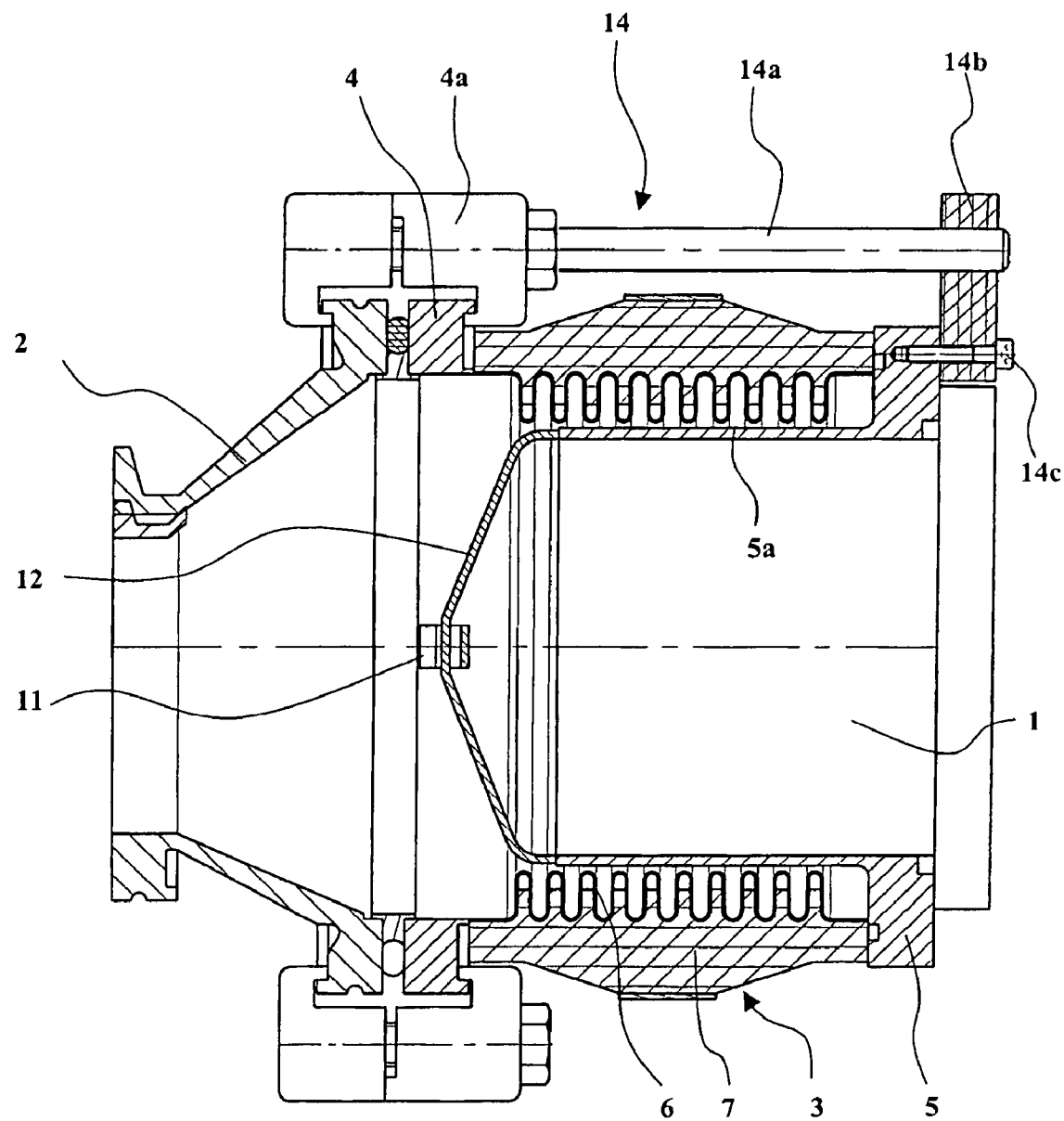
FIG. 5 is a longitudinal cross-sectional front view of a passive damping adapter structure according to another approach, for adapting a pump inside the damping adapter that is oriented along a horizontal axis.
Figure 6:
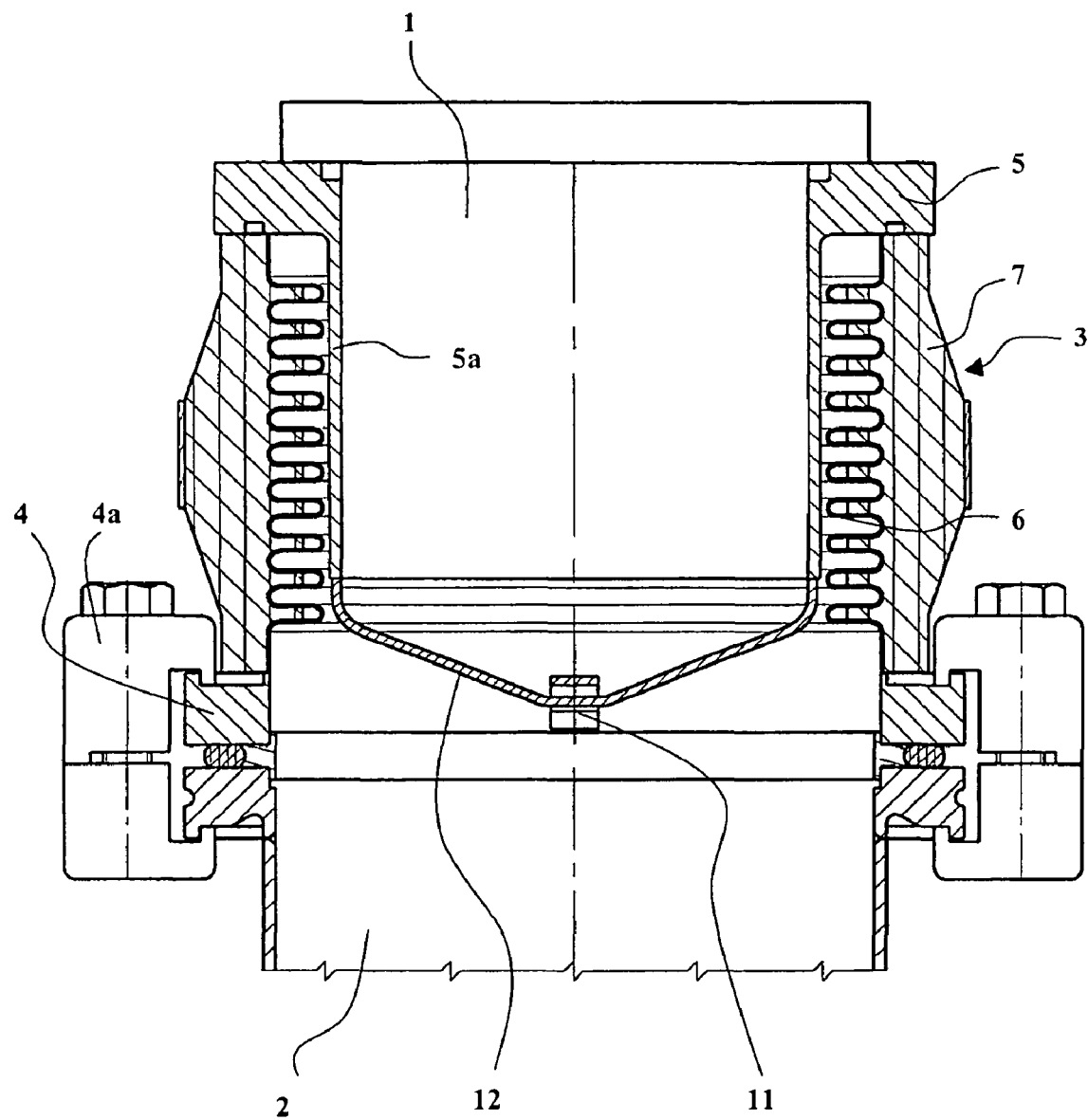
FIG. 6 illustrates a passive damping adapter structure with a pump engaged in the damping adapter and oriented along a vertical axis above the service chamber.
Figure 7:
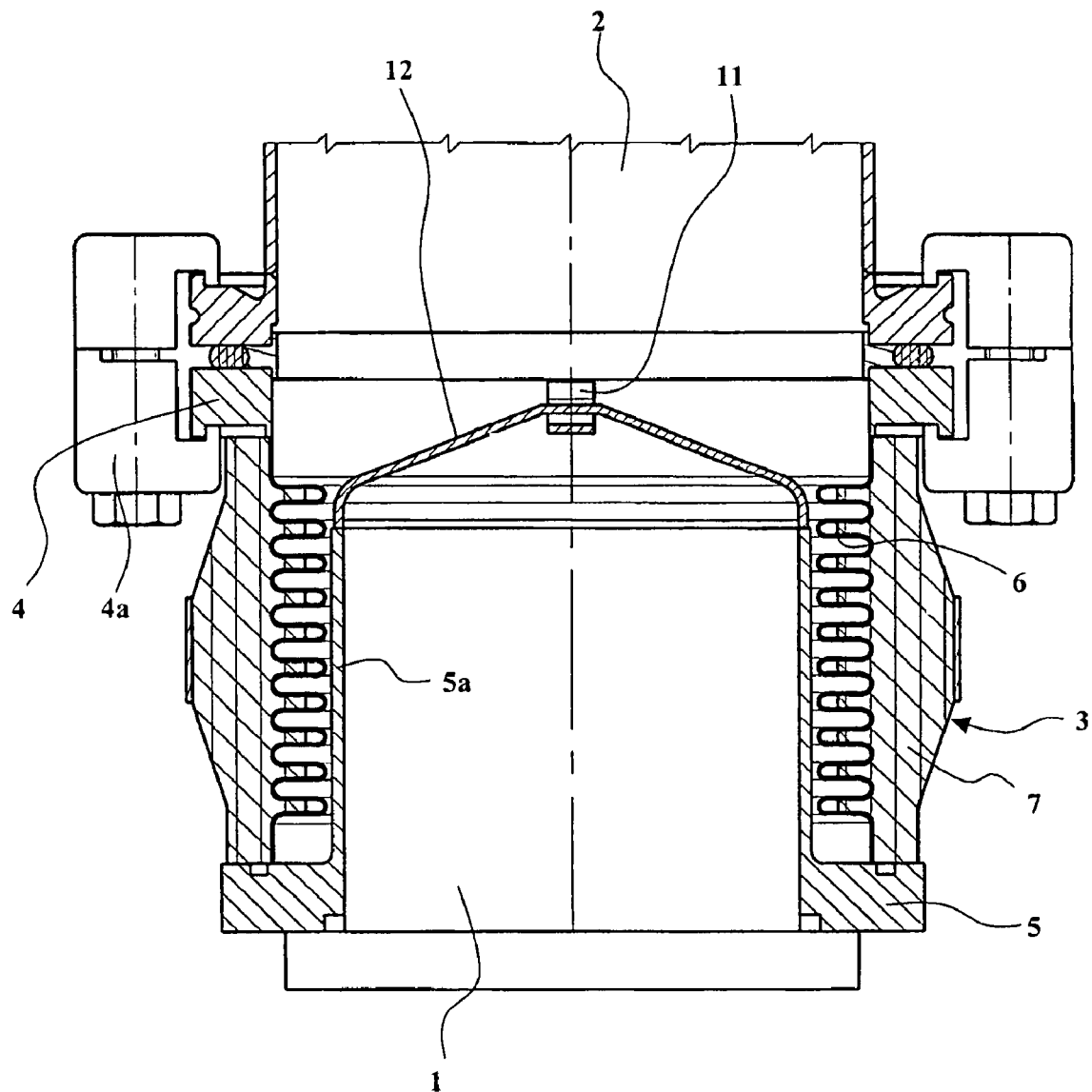
FIG. 7 illustrates a damping adapter structure with a pump incorporated inside the damping adapter and oriented along a vertical axis below the service chamber.

We will now look at the approaches illustrated in FIGS. 5 to 7.

In these FIGS. 5 to 7 the same elements can be found as in the previous approach in FIG. 1, and these same elements have the same numeric references.

There is a difference in the fact that, in these approaches in FIGS. 5 to 7, the vacuum pump 1 is small in size and is engaged in whole or in part inside the flexible bellows forming the tubular wall 6. This reduces the overall dimensions of the assembly, and above all further reduces the pumped volume.

For the insertion of the pump 1, the inlet arch 11 is lower and does not penetrate the inside of the tubular wall 6.

However, the outlet arch 12 is higher, being connected to the outlet flange 5 by means of an axial extension made up of an insertion casing 5a formed by a coaxial tubular excrescence of the outlet flange 5 inside the tubular wall 6. The insertion casing 5a is intended to receive the pump 1, along practically the entire length of the tubular wall 6. The outlet arch 12 then develops radially, from the end upstream of the insertion casing 5a, to interlace with the inlet arch 11.

In the approach in FIG. 5, a suspension device is also used, allowing the assembly to be assembled horizontally, in other words with the pump 1 oriented along a horizontal rotation axis. The suspension device 14 consists of a horizontal upper rod 14a, secured by its first end to the tightening dog 4a, and supporting by its second end an elastic element 14b that is itself secured with a screw 14c to the outlet flange 5. The suspension device 14 is able to support the weight of the pump 1, being cantilevered at the outlet of the service chamber 2.

In the approach in FIG. 6, the device consists of the same elements as in the approach in FIG. 5, except for the presence of a suspension device 14. Indeed, in this case, the pump is oriented vertically, above the service chamber 2, and does not require a side suspension device.

In the approach in FIG. 7, the same devices are used as in the approach in FIG. 6, but the pump 1 is suspended below the service chamber 2.

Figure 8:
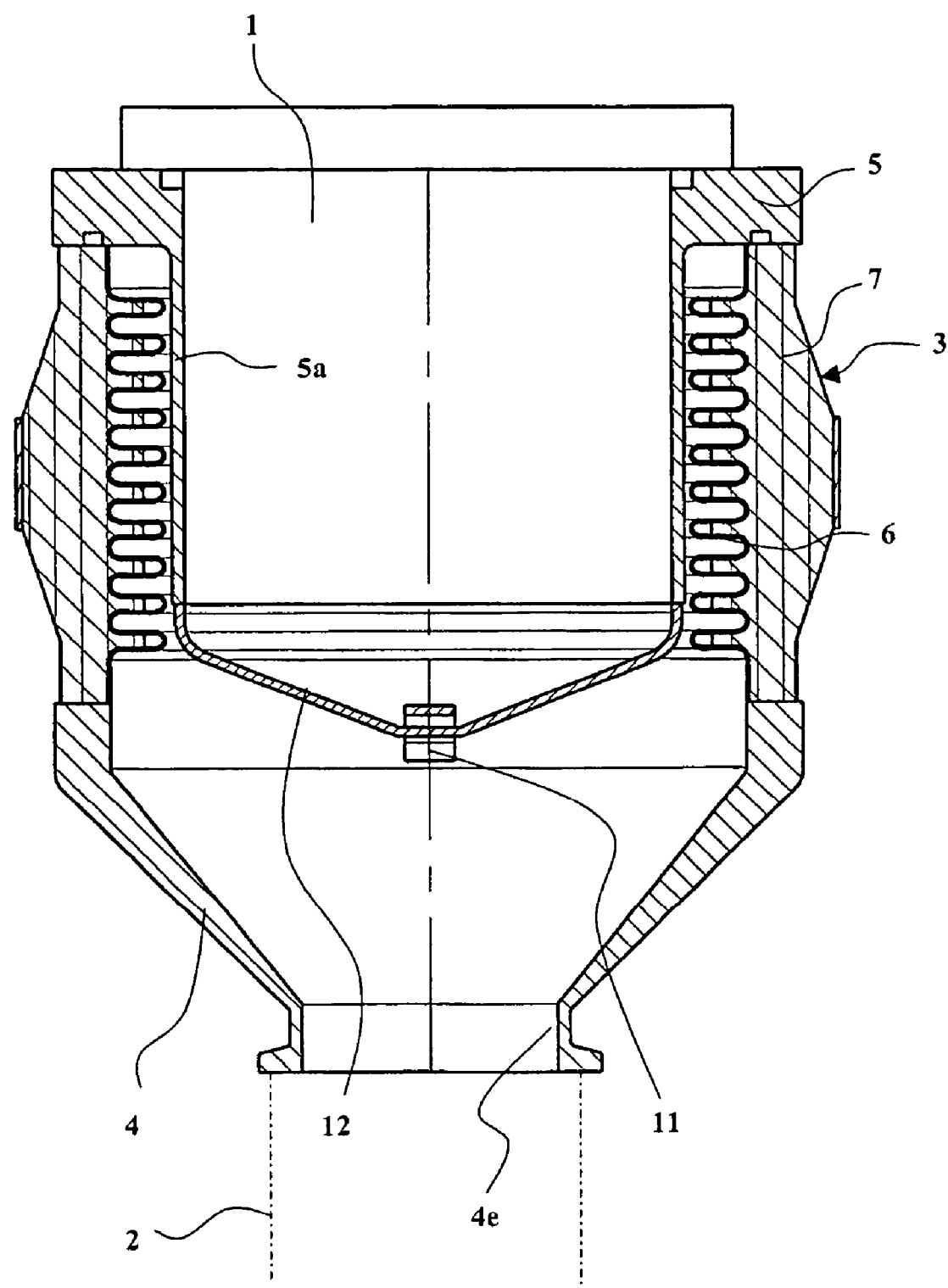
FIGS. 8 and 9 illustrate another passive damping adapter structure with a pump incorporated inside the damping adapter, along a vertical axis, above or below the service chamber, respectively, in an approach with smaller overall dimensions.
Figure 9:
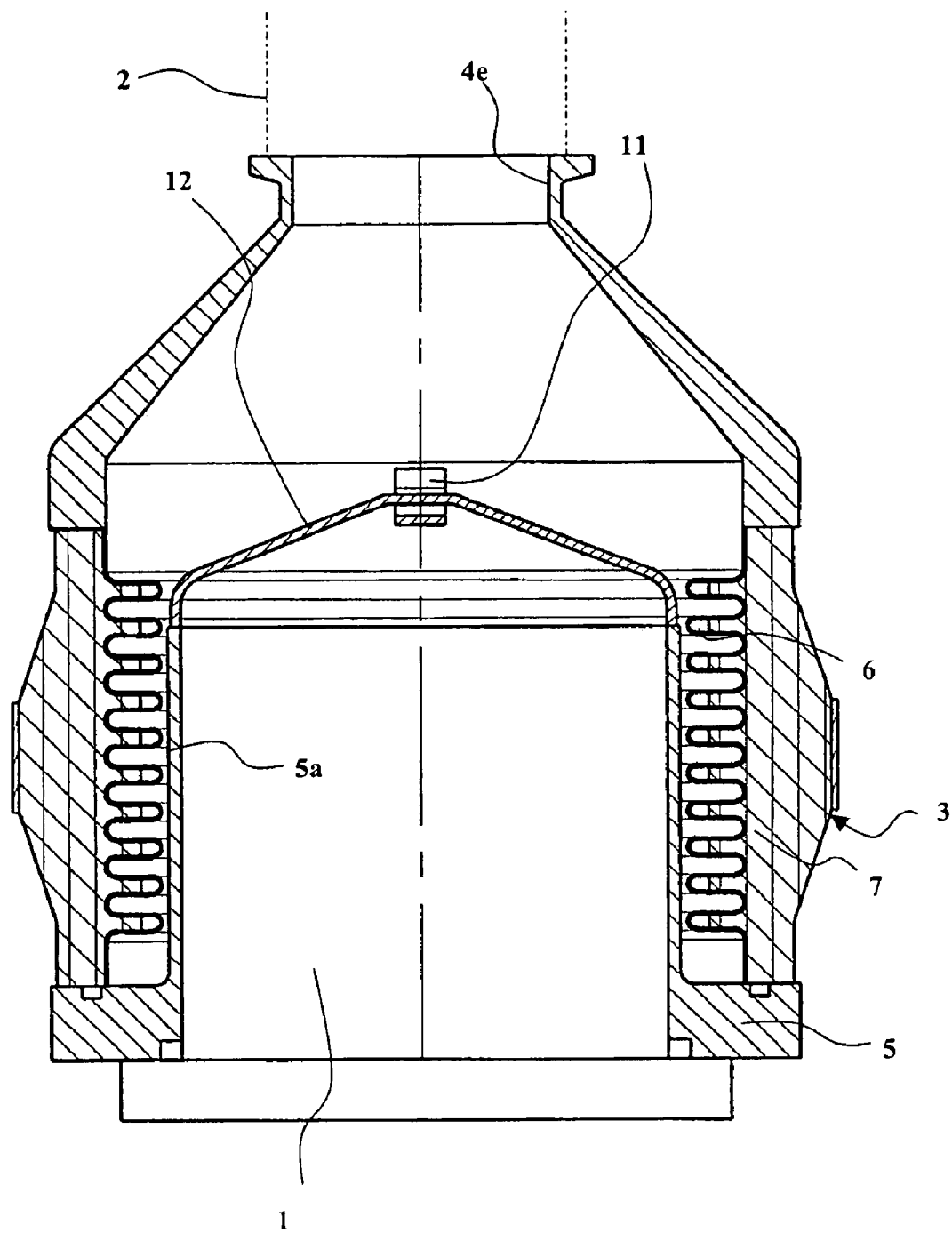

The approaches in FIGS. 8 and 9 concern a structure with further reduced overall dimensions. The same elements can be found as in the previous approaches in FIGS. 5 to 7, with a pump engaged inside the tubular wall 6, but this time there are no tightening dogs to secure the inlet flange 4 to the service chamber 2. In this case, the inlet flange 4 is conformed with a gradual reduction, for example conical, and is secured to the service chamber 2 according to a reduced diameter 4e. Such a structure is suitable for use in places with a smaller volume, for example along an electron microscopy column, or with smaller volume chamber instrumentation, while maintaining the pump's performance level.

The tests carried out with these damping adapter structures have shown a damping increase of around 4.4 for radial vibrations and 1.9 for axial vibrations.

The present invention is not limited to the approaches explicitly described; it includes the variants and general applications that are within the scope of professionals.

The invention claimed is:

1. A vacuum line damping adapter insertable in a suction duct between a service chamber and a vacuum pump, the adapter comprising a tubular duct wall in the form of a flexible bellows having ends and surrounded by a damping sleeve supported on both ends of the flexible bellows, in which the flexible bellows' plys receive, on their outer faces, a passive damping elastomer engaged between said plys, wherein the dampening sleeve comprises a solid elastomer material which is spaced radially apart from apart from the flexible bellows at positions between said plys.

2. The damping adapter according to claim 1, in which the passive damping elastomer engaged between the bellows' plys is joined to the damping sleeve.

3. The damping adapter according to claim 2, in which the passive damping elastomer is of a piece with the damping sleeve.

4. The damping adapter according to claim 1, further comprising at least one anti-rotation clevis are arranged on the outside of the bellows to withstand the relative rotation stresses between the vacuum pump and the process chamber.

5. The damping adapter according to claim 1, in which the damping sleeve also includes an active vibration control device, which optimizes vibration damping.

6. The damping adapter according to claim 5, in which the active vibration control device consists of a piezoelectric transverse film, engaged between one end of the damping sleeve and a vacuum pump connecting flange, and powered by a control device operating according to signals originating from an appropriate vibration sensor, a vacuum pump magnetic bearing control device, or a device powering the drive motor of the vacuum pump.

7. A vacuum line including a damping adapter according to claim 1, inserted in a vacuum duct between a vacuum pump and a service chamber.

8. The vacuum line according to claim 7, in which the vacuum pump is engaged at least in part inside the flexible bellows forming the tubular wall.

9. The damping adapter according to claim 4, comprising diametrally opposed anti-rotation clevis arranged around the bellows.

10. The damping adapter according to claim 4, wherein the clevis is fitted with elastomer bearing pads.

11. The damping adapter according to claim 9, wherein the clevis is fitted with elastomer bearing pads.

* * * * *